US010073277B2

(12) United States Patent
Plumb

(10) Patent No.: US 10,073,277 B2
(45) Date of Patent: Sep. 11, 2018

(54) TRAJECTORY COMPENSATING RETICLE FOR ACCURATE ENGAGEMENT OF A TARGET AT AN UNKNOWN DISTANCE

(71) Applicant: Handl Defense, LLC, Auburn, WA (US)

(72) Inventor: Francis M. Plumb, Issaquah, WA (US)

(73) Assignee: Handl Defense, LLC, Mesa, AZ (US)

( * ) Notice: Subject to any disclaimer, the term of this patent is extended or adjusted under 35 U.S.C. 154(b) by 158 days.

(21) Appl. No.: 15/288,184

(22) Filed: Oct. 7, 2016

(65) Prior Publication Data

US 2017/0102553 A1  Apr. 13, 2017

Related U.S. Application Data

(60) Provisional application No. 62/238,277, filed on Oct. 7, 2015.

(51) Int. Cl.
| | | |
|---|---|---|
| *F41G 1/38* | (2006.01) | |
| *G02B 27/32* | (2006.01) | |
| *F41G 3/08* | (2006.01) | |
| *G02B 27/34* | (2006.01) | |

(52) U.S. Cl.
CPC ............... *G02B 27/32* (2013.01); *F41G 1/38* (2013.01); *F41G 3/08* (2013.01); *G02B 27/34* (2013.01)

(58) Field of Classification Search
CPC ... G02B 27/32; F41G 1/38; F41G 3/08; F41G 1/12
USPC .................................................... 33/297, 298
See application file for complete search history.

(56) References Cited

U.S. PATENT DOCUMENTS

| | | | | |
|---|---|---|---|---|
| 3,431,652 | A * | 3/1969 | Leatherwood | F41G 1/38 33/353 |
| 4,263,719 | A * | 4/1981 | Murdoch | F41G 1/12 33/277 |
| 7,832,137 | B2 * | 11/2010 | Sammut | F41G 1/473 235/404 |
| 7,877,886 | B1 * | 2/2011 | Hamilton | F41G 1/12 33/297 |
| 7,958,643 | B1 * | 6/2011 | Wu | G02B 23/14 33/297 |
| 8,701,330 | B2 * | 4/2014 | Tubb | F41G 1/38 33/297 |
| 2005/0150121 | A1 * | 7/2005 | Jaklitsch | F41G 3/326 33/286 |
| 2011/0030264 | A1 * | 2/2011 | Davidson | F41G 1/38 42/122 |
| 2011/0132983 | A1 * | 6/2011 | Sammut | F41G 1/38 235/404 |

(Continued)

*Primary Examiner* — G. Bradley Bennett
(74) *Attorney, Agent, or Firm* — Richard Blakely Glasgow

(57) ABSTRACT

A reticle for use in a firearm scope that compensates for the trajectory of a bullet, allowing the shooter to accurately engage the target despite the target's distance from the shooter. The reticle uses a number of trajectory arcs and distance markings that correspond to the target's size and distance to provide the shooter with an accurate aiming of the target. Once the outer edges of the target aligns with the trajectory arcs the target is ready to be engaged. Distance markings, windage markings, and reticle illumination provide for further accuracy of the shot. A milling tree integral to the reticle provides for a quick determination of the target's distance, particularly in instances when the target is not intended to be engaged.

14 Claims, 3 Drawing Sheets

(56) References Cited

U.S. PATENT DOCUMENTS

| | | | |
|---|---|---|---|
| 2014/0059914 A1* | 3/2014 | Sammut | F41G 1/38 |
| | | | 42/122 |
| 2017/0123224 A1* | 5/2017 | Hamilton | F41G 1/38 |
| 2017/0261289 A1* | 9/2017 | Lasco | F41G 3/08 |
| 2017/0328676 A1* | 11/2017 | Tubb | F41G 3/08 |
| 2018/0081192 A1* | 3/2018 | Qu | G02B 27/32 |

* cited by examiner

TRAJECTORY COMPENSATING RETICLE FOR ACCURATE ENGAGEMENT OF A TARGET AT AN UNKNOWN DISTANCE

CROSS-REFERENCE TO RELATED APPLICATIONS

This application claims the benefit of U.S. Provisional Patent Application No. 62/238,277, entitled "Rapid Target Engagement Reticle" and filed on Oct. 7, 2015. Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to firearm accessories, and more particularly to a reticle for use with an optical scope of a firearm. A scope reticle is what is commonly referred to as "crosshairs," with the most common crosshairs being lines in the shape of a cross. Although reticles can be used in a range of optical instruments, including those used for astronomy or surveying, the most recognizable use for reticles is with telescopic sights for aiming firearms. When used with firearms, the prior art reticles provide a point of aiming for the shooter based on a fixed single distance. Because projectiles travel in arcs, shooters must account for bullet drop when aiming. The problem with existing reticles is that the shooter is required to estimate on a graphic interface in order to compensate for this bullet drop. Not only must the shooter estimate the range of the target, but the shooter must also make manual adjustments to the scope itself to compensate for the distance the bullet must travel. The present invention overcomes these drawbacks by providing a quicker way to engage targets by compensating for the drop of the projectile over a set range. The present invention allows the shooter to compensate for bullet drop throughout the entire trajectory. The present invention also allows the user to quickly determine the distance of a target, even if the user has no intention of shooting the target.

BRIEF SUMMARY OF THE INVENTION

The present invention is directed to a reticle for use with a scope of a firearm that allows the user of the firearm to compensate for bullet drop for the entire bullet trajectory. It is a desire of the present invention to provide firearm shooters with a quicker way to engage targets by compensating for the drop of the bullet over a set range.

These and other features, objects and advantages of the present invention will become better understood from a consideration of the following detailed description of the preferred embodiments and appended claims in conjunction with drawings as described following:

DETAILED DESCRIPTION OF THE PREFERRED EMBODIMENT(S)

The present invention is directed toward a reticle for use with a firearm scope that is specially designed to allow the shooter to more quickly engage the target, as the reticle itself is designed to allow the shooter to compensate for the drop of the bullet once fired. While it is understood that the present invention may be used in connection with any type of firearm, certain examples may be given for use in tactical and long-range shooting, particularly in connection with law enforcement or military operations. It is understood, however, that the reticle may be used in recreational sport and hunting operations or in any other operation where accurate engagement of a target is desired.

The rifle scope reticle of the present invention assists the shooter in engaging a target at an unknown distance. The reticle is specially designed based on a known target size and it is understood that the reticle may be designed for any number of targets. For example, firearms designed for use in law enforcement or military situations may implement a reticle that is specifically designed based on the average size of a human target, as a non-compliant and hostile human may be the intended target. Thus, in certain embodiments the reticle will be designed based on the known size of a human head or shoulders, which are approximately 125 mm or 400 mm wide respectively. It is understood that while the reticle can be used for any target, certain examples herein may refer to the target being the head or shoulders of a human.

Figure 1:
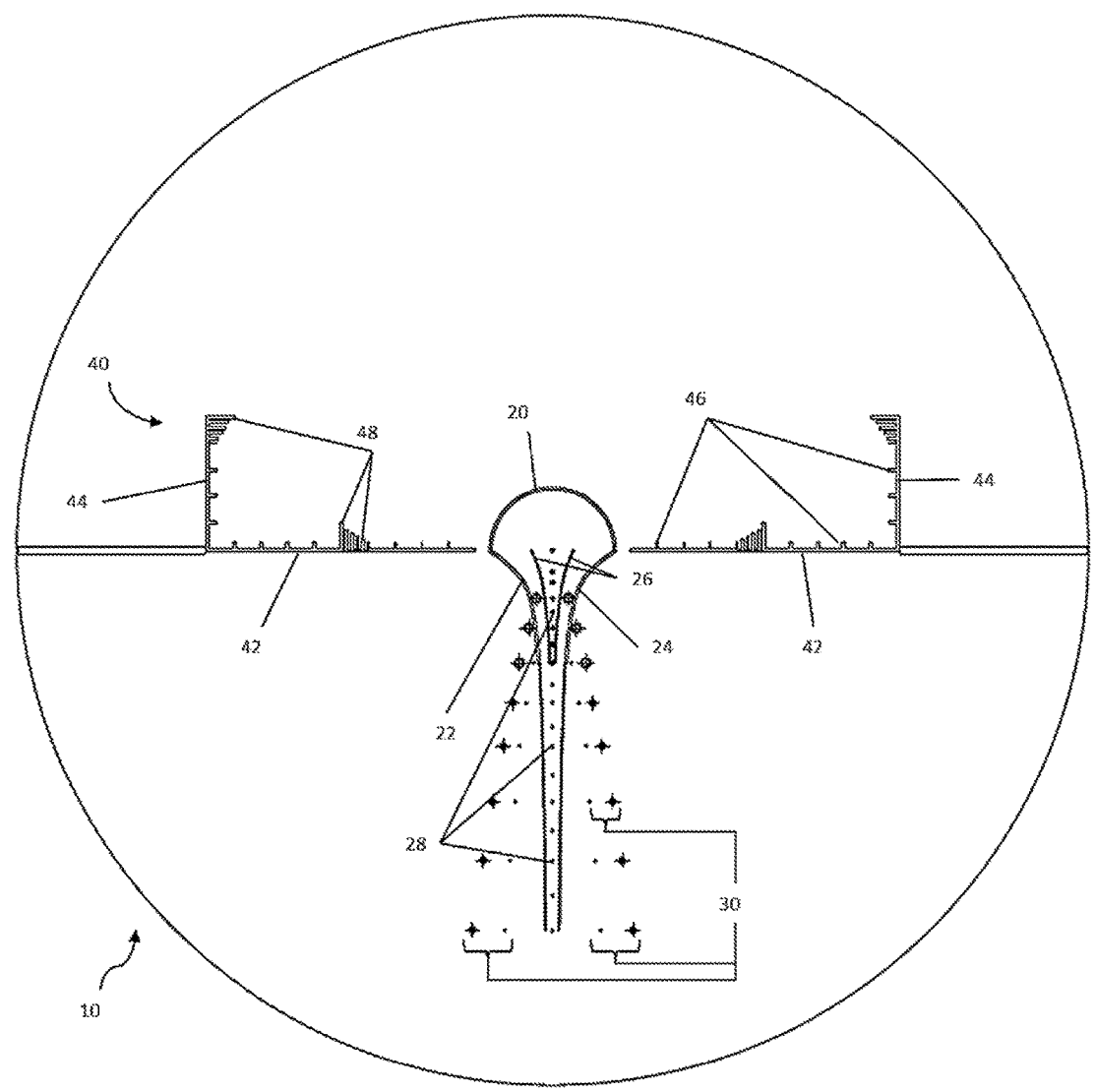
FIG. 1 is a view of one embodiment of the present invention having a milling tree, trajectory arcs, and dot-style distance markings.
Figure 2:
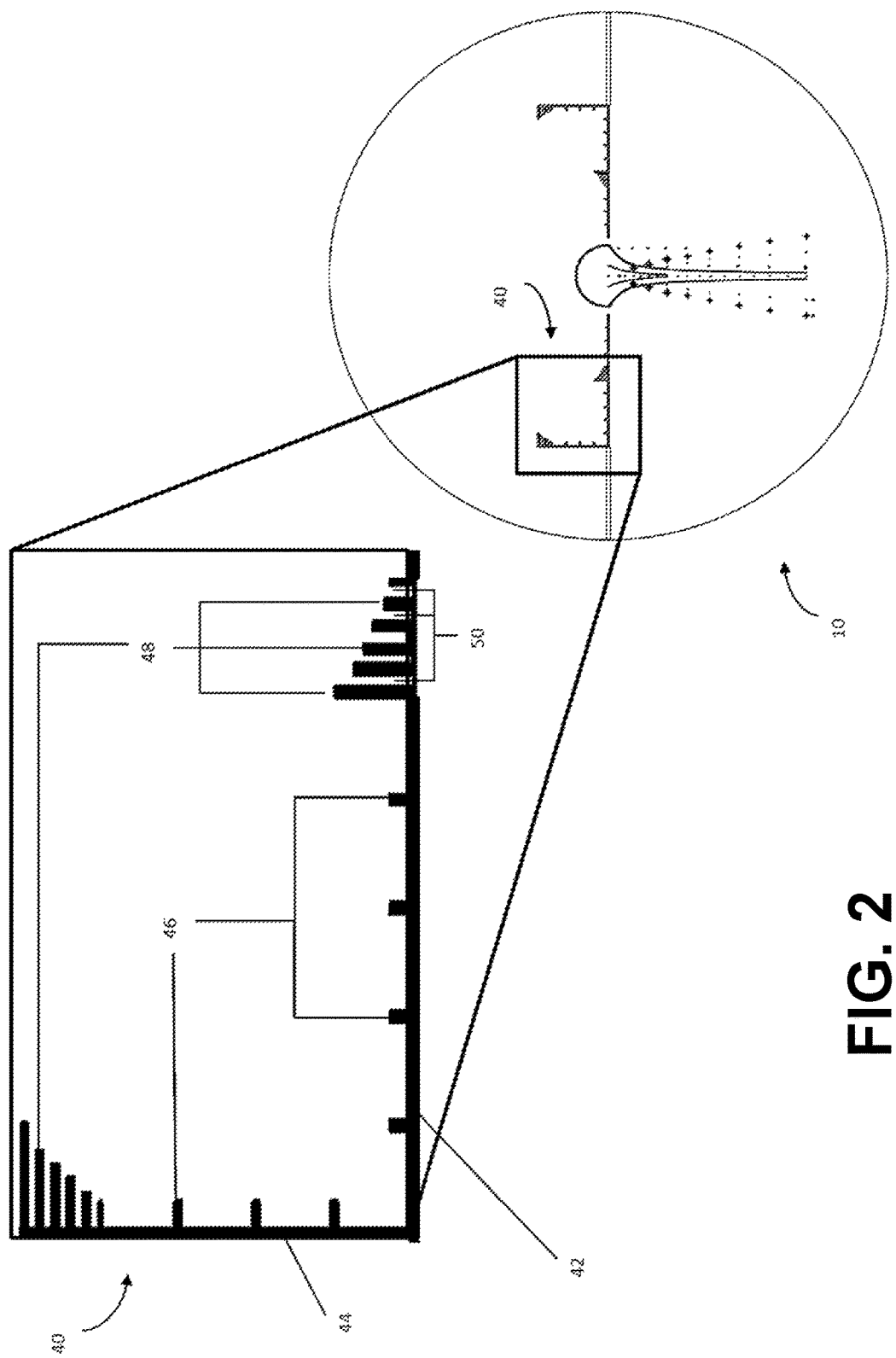
FIG. 2 is an exploded view of FIG. 1 of one embodiment of the present invention showing the milling tree portion of the reticle.
Figure 3:
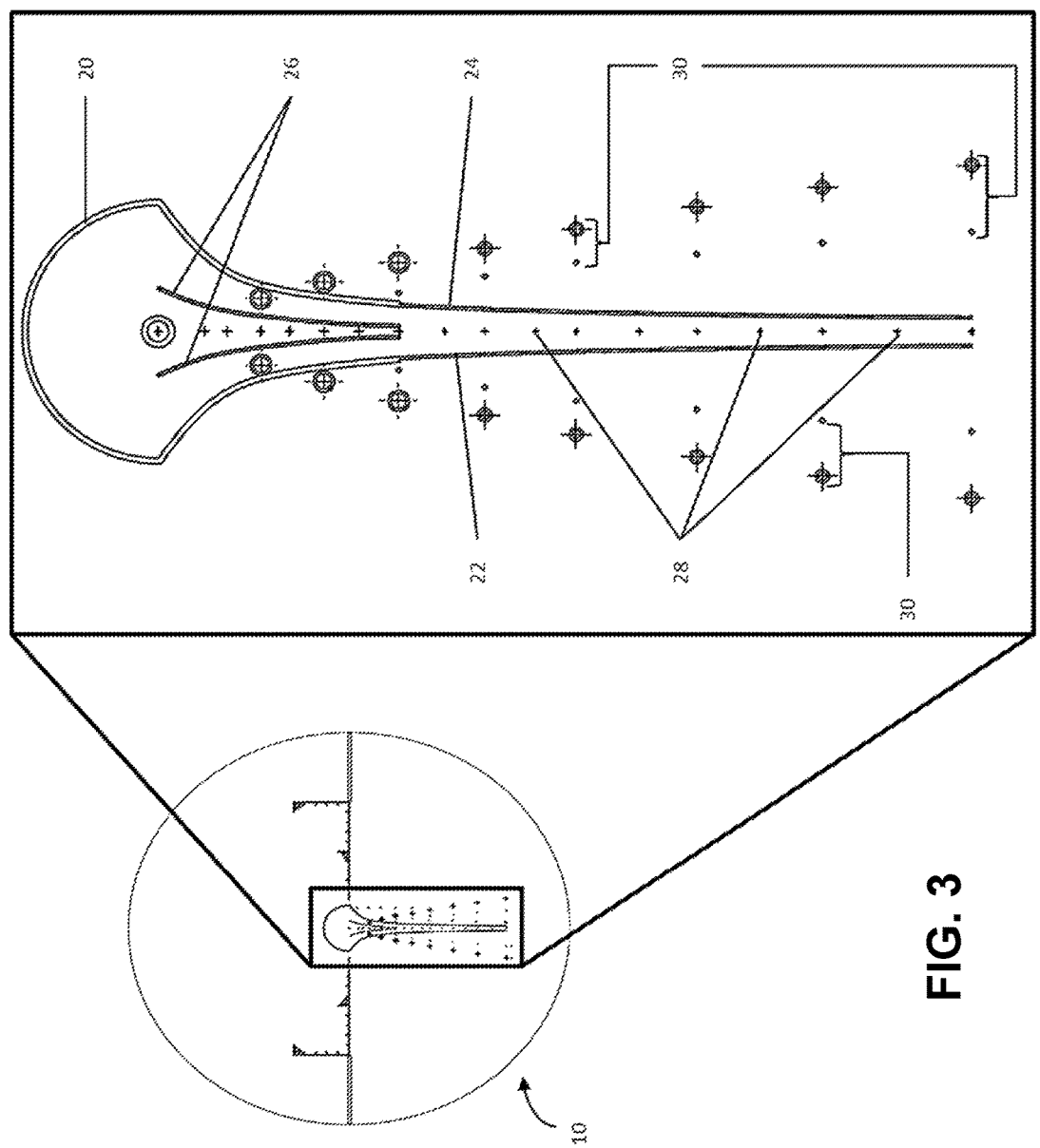
FIG. 3 is an exploded view of FIG. 1 of one embodiment of the present invention showing the trajectory arcs, distance markings, and windage markings of the reticle.

With reference to FIGS. 1-3, the preferred embodiments of the present invention may be described. Generally, the reticle 10 of the present invention consists of trajectory arcs 22, 24, 26, which correspond to the trajectory of the bullet, distance markings 28, each of which corresponds to a number denoting the target's distance away from the shooter, and windage markings 30, which are designed to assist the shooter in compensating for wind effect on the bullet. In one embodiment of the present invention, the reticle 10 further comprises a milling tree 40, which allows the user to determine the size of the target in milradians. These components work together to allow the shooter to aim at the desired target while compensating for the bullet's projectile over a long distance and other conditions in the field. The invention also allows the user to determine the distance of a target in a quick and accurate manner, even in situations when the user has no intention of shooting the target. Each of these components will be described more fully below.

Before describing each of the components in detail, it is necessary to discuss the use of milradians (simply referred to as mils) in the use of the reticle, as this unit of measurement is critical to the determination of the target's distance. A mil is a unit of angular measurement that is defined as one thousandth of a radian, which means that a mil is approximately equal to $1/6400^{th}$ of a circle. The use of mils is common to aid in the accurate aiming of weapons, including firearms. Range estimation using mils involves a simple calculation, where the distance to the target (in meters) is equal to the actual size of the target (in millimeters) divided by the measured size of the target when viewed through the reticle (in mils) at that distance. Thus, given a known target size in millimeters, the distance of the target can simply be calculated by dividing by the target's measured size in mils. For example, a target with a size of 400 mm and a measured size of 2 mils when viewed through the reticle would be determined to be 200 meters away (400 mm/2 mils=200 meters). This relationship allows the current reticle invention to be used in range determination.

In one embodiment, the reticle comprises a milling tree 40 that allows the shooter to determine the size of the target in mils quickly. In turn, this determined size of the target in mils can be used in the formula described above to determine the distance of the target in meters. Turning to FIGS. 1 and 2, the milling tree 40 of the reticle 10 may be described. Generally, the milling tree 40 consists of a horizontal baseline 42 and two vertical end lines 44. A number of measuring lines 46, 48 extend perpendicularly from the horizontal baseline 42 and vertical end lines 44. Negative spaces 50 between those lines are created as a result. In one embodiment, the series of measuring lines may consist of primary measuring lines 46 and secondary measuring lines 48 where the primary measuring lines 46 denote a greater mil increment than the secondary lines 48. These series of lines 46, 48 and negative spaces 50 provide the user a tool for measuring the mil of the target viewed through the reticle 10. In using the milling tree 40, the target is aligned with a first measurement line (either a primary line 46 or secondary measuring line 48) which will effectively serve as the "zero" measurement point. The total number of measuring lines 46, 48 and negative spaces 50 that the target spans is the determined mil measurement. For example, in one embodiment, the milling tree will consist of secondary measuring lines 48 that create a series of five lines 48 and five negative spaces 50. Each of the secondary measuring lines 48 and negative spaces 50 may be equal to one tenth of a mil. This allows the shooter to accurately determine the size of the target in mil in one-tenth ($1/10^{th}$) increments. It is understood that the series of lines 46, 48 and negative spaces 50 may correspond to any mil measurement and is not limited to one-tenth increments.

The size of the target in mils is determined by aiming the milling tree 40 on the target. For example, if the secondary measurement lines 48 and negative spaces 50 each denote one-tenth of a mil and the target starts at one secondary measuring line 48 and has a width that spans over ten secondary measurement lines 48 and ten negative spaces 50 between those lines, the target will span twenty one-tenth mil increments and therefore will measure as two mils wide (20 increments×0.1 mil increments=2 mils). This determined number of mils will then be used according to the simple calculation described above to determine the distance of the target. For example, a male human target may be 400 mm from shoulder to shoulder. If the shooter looks through the reticle 10 and the male target is determined to be two mils wide using the milling tree 40, the shooter could determine that the target is 200 meters away (400 mm/2mils=200 meters). Thus, the milling tree 40 allows the shooter to quickly determine the size of the target in mils, which can then be used to determine the distance of the target based off the known target size. The milling tree 40 may be especially useful in situations in which the firearm user does not intend to shoot the target but still needs to determine the target's distance.

The present invention also includes two outer trajectory arcs 22, 24: a left outer trajectory arc 22 and a right outer trajectory arc 24. These trajectory arcs 22, 24 are symmetrical and vertical. In one embodiment, the trajectory arcs 22, 24 may extend downward from the middle of the horizontal baseline 42 of the milling tree 40, as shown in FIG. 1. These trajectory arcs 22, 24 represent the flight of the bullet as it leaves the firearm. The distance between the arcs 22, 24 corresponds to the width of the intended target at a distance away from the shooter. Using the same relationship described above but rearranging the equation to calculate the measurement of the target in mils, the space between the trajectory arcs 22, 24 (in mils) at any point may be predetermined by taking the known target size (in millimeters) and dividing by a target distance. By using a number of target distances, which correspond to a number of different points on the arcs, a set of arcs 22, 24 that represents the trajectory of the bullet can be created. These trajectory arcs 22, 24, in turn, provide accurate aiming guidance to the shooter at a number of target distances. Because the arcs 22, 24 represent the trajectory of the bullet and the distance between the arcs is determined using the formula described above, the trajectory arcs 22, 24 are symmetrical in a vertical plane and the arcs 22, 24 tend to converge at one end, as shown. The arcs 22, 24 tend to converge because as the distance to the target increases, the size of the target in mils tends to get smaller (and thus the distance between the arcs is smaller). For example, a target with a size of 400 mm at a distance of 600 meters would correspond to the trajectory arcs being 0.66 mil apart at the point corresponding to that distance (i.e. 400/600=0.66). Alternatively, a target of the same size at 800 meters would generate a mil measurement of 0.5 mils (i.e. 400/800=0.5). Thus, when the target is at a closer distance (near the top of the trajectory arcs), the trajectory arcs 22, 24 are farther apart (a larger mil measurement) than when the target is further way (keeping in mind that the distance to the target increases as you move from the top of the trajectory arc to the bottom of the trajectory arc).

These trajectory arcs 22, 24 are designed such that when the target is at a certain distance the outer portions of the target align precisely with the trajectory arcs 22, 24. For example, where the target is a human target the outer trajectory arcs 22, 24 may correspond to the shoulder width of the intended target at the corresponding distance. The shooter knows that the target is in range, and thus can be engaged, when the left side of the target is aligned with the left arc 22 at the same time the right side of the target is aligned with the right arc 24. For example if the target is a human, when the target's left shoulder is aligned with the left outer trajectory arc 22 and the target's right shoulder is aligned with the right outer trajectory arc 24, the shooter knows the target is at range and can be engaged effectively. If the reticle 10 is aimed such that the target does not align with the arcs 22, 24, the target is not in range and the bullet may not strike the target as intended. As such, when the shooter is aiming, the rifle must be raised to the position where the trajectory arcs 22, 24 align with the target. The upward movement compensates for the distance of bullet drop in the trajectory of the bullet. Rather than estimating the distance the shooter is required to raise the gun, the trajectory arcs 22, 24 provide the shooter a visible guide to where the gun should be raised. Because the shooter no longer has to estimate the drop in the bullet because the reticle 10 compensates for the bullet drop itself, the shooter's accuracy will be increased.

In certain embodiments, the present invention may also consist of two internal trajectory arcs 26: a left internal trajectory arc and a right internal trajectory arc. These arcs 26 are designed, like the outer trajectory arcs 22, 24, to allow the shooter to know when the target is at the appropriate distance for firing. These internal trajectory arcs 26 may be used to represent portions of the target that are smaller than the outermost parts of the target. For example, while the outer trajectory arcs 22, 24 may represent the shoulder width of a human target, the internal trajectory arcs 26 may represent the width of the head of the target. As with the outer arcs 22, 24, once the left side of the target's head aligns with the left inner arc 26 and the right side of the target's head aligns with the right inner arc 26, the target is at the range corresponding to the bullet's trajectory and the shooter can engage the target. Other than being intended as a guide for a smaller target size, these inner trajectory arcs 26 are designed and implemented in the same manner as the outer trajectory arcs 22, 24 described above.

As noted above, the present invention also comprises a number of distance markings 28. The distance markings 28 are positioned on the reticle 10 such that they are between the set of symmetrical trajectory arcs, whether the outer trajectory arcs 22, 24 or the inner trajectory arcs 26. The distance markings 28 are located at a number of points extending from the first end of the outer arcs 22, 24 to the second end of the outer arcs 22, 24. The distance markings 28 at the first end of the outer arcs 22, 24 may also be further positioned between the pair of inner arcs 26, extending from the first end of the inner arcs 26 to the second end of the inner arcs 26.

The distance markings 28 represent the distance from the shooter's position that corresponds to the intended target and thus gives the shooter a representation of the target's distance (in meters) away from the shooter. The distance marking 28 aligned with the target when the reticle 10 is in the appropriate aiming position (i.e. when the outer edges of the target align with the trajectory arcs, as described above) communicates to the shooter the distance of the target. For example, if the target is positioned between the outer arcs 22, 24 at the distance marking 28 corresponding to 400 meters, the shooter can determine that the target is 400 meters away. Thus, the user may use the distance markings 28 in conjunction with the trajectory arcs 22, 24, 26 to determine the distance of the target. Thus, in one embodiment, the distance of the target can be determined without implementing the milling tree 40 described above.

In one embodiment, several different types of markings are used to denote different increments in distance away from the shooter. The use of different markings allows the shooter to quickly determine the distance of the target. For example, a horizontal line may implemented to denote a larger incremental distance (100 meters, for example) while dots may be used to denote smaller increments in distance (25 meters or 50 meters). This allows the shooter to quickly and precisely calculate the distance of the target by locating the nearest horizontal marking (denoting the higher increment) and then adding the smaller incremental distance to the distance denoted by the horizontal marking. This allows the shooter to bracket distances to the target quickly, which is especially useful in situations in which the target's distance needs to be determined, but the user does not intend to shoot the target. Alternatively, the distance makers 28 may all be of the same style while windage markings 30 (as described below) may be implemented at alternating distance markings 28 to provide the quick reference for distance determination. For example, the distance markings 28 may comprise a number of plus sign markings at different intervals, with every other distance markings 28 having windage markings 30 (markings positioned outside of the symmetrical arcs 22, 24). While these windage markings 30 serve to assist in adjusting for wind effect, as described below, these windage markings 30 may also be used as a quick reference to assist the shooter in determining the target's distance. It is understood that the distance markings can comprise any number of styles, including but not limited to, horizontal lines, dots, plus signs, or any combination thereof.

The distance markings 28 are a predefined vertical distance away from each other on the reticle 10 and this vertical distance will vary dependent on the caliber of weapon associated with the reticle 10 because the distance between each distance maker 28 is dependent on the bullet's trajectory. A bullet's trajectory is the path the bullet will take under the action of gravity. The bullet's trajectory may also be affected by other forces, including aerodynamic friction. As such, the bullet's drop-rate is a function of the bullet's kinetic energy, velocity, and resistance. As the bullet moves through the trajectory it loses energy and as this energy is lost, the bullet's altitude tends to decrease at a faster rate. As such, this vertical distance between the distance markings 28 will change according to the caliber of the weapon to which the reticle 10 is attached because the trajectory of the bullet will change. Thus, the position on the reticle 10 corresponding to the target's distance will change. Further, the distance markings 28 tend to be spaced further apart as the distance increases (i.e. as you move toward the bottom of the trajectory arcs) due to the bullet's increased rate of falling.

Windage markings 30 may also be implemented in the present invention. The windage markings 30 are designed to denote the distance left or right that winds would shift the impact of the bullet at that set distance. Windage markings 30 corresponding to wind speeds of 5 mph and 10 mph left and right of the target may be implemented. These windage markings 30 are positioned outside of the trajectory arcs 22, 24, with a number of windage markings on the left side of the left arc 22 and a number on the right side of the right arc 24. The windage markings 30 on the left side are for use when the wind is blowing in a leftward direction and the windage markings 30 on the right are for use when the wind is blowing in a rightward direction. In some embodiments, the windage markings 30 may be implemented only at certain distance markings 28, while in other embodiments windage markings may be may be implemented at each distance marking 28. To account for the change in direction based on the wind, the windage marking 30 at the appropriate distance marking 28 and corresponding to the appropriate wind speed is aligned with the target in order to accurately engage the target. For example, if the wind is blowing 5 mph to the right of the target, the shooter aligns the target at the appropriate distance by aligning the target with the trajectory arcs 22, 24 and the shooter then aligns the 5 mph windage markings 30 at that distance to the target to compensate for the wind shift.

In certain embodiments, the present invention may be partially illuminated to help the shooter engage the target in low light conditions. In one embodiment, only the top portion 20 of the reticle 10 is illuminated. Because this invention may be illuminated, it can be used as a reflex sight or in low light conditions. The reticle 10 may be illuminated in any manner that is well-known in the art. For example, the reticle 10 may be illuminated by a plastic or fiber optic light pipe or by a battery powered LED light. Furthermore, because the reticle 10 is positioned in the scope of the firearm, the reticle 10 may be used in combination with a variety of firearms. The reticle 10 may be positioned in the scope with any manner known in the art. The reticle 10 may include any appropriate substrate that would be well-known to those skilled in the art. For example, the reticle 10 may be a wire reticle, where wires are flattened and used to create the various lines and markings. Alternatively, the reticle 10 may be an etched glass reticle, in which the lines and markings are etched into a thin place of glass that is placed inside the scope.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A reticle comprising:
   a. a pair of outer arcs having a first end and a second end, wherein the pair of outer arcs is separated by a negative space, wherein the negative space separating the pair of outer arcs is narrower at the second end of the pair of outer arcs than at the first end of the pair of outer arcs;
   b. a plurality of distance markings positioned between the pair of outer arcs; and
   c. a plurality of windage markings positioned outside the pair of outer arcs.

2. The reticle of claim 1, wherein the plurality of distance markings are positioned at a plurality of points extending from the first end of the pair of outer arcs to the second end of the pair of outer arcs.

3. The reticle of claim 1, wherein the plurality of distance markings comprise plus sign markings.

4. The reticle of claim 1, wherein the plurality of distance markings comprise dot markings.

5. The reticle of claim 1, further comprising a pair of inner arcs positioned between the pair of outer arcs, wherein the pair of inner arcs is separated by a negative space, wherein the negative space separating the pair of inner arcs is narrower than the negative space separating the pair of outer arcs.

6. The reticle of claim 5, wherein the pair of inner arcs comprises a first end and a second end, wherein a negative space separating the pair of inner arcs is narrower at the second end of the pair of inner arcs than at the first end of the pair of inner arcs.

7. The reticle of claim 6, further wherein some of the plurality of distance markings are positioned between the pair of inner arcs.

8. The reticle of claim 1, wherein the plurality of windage markings are adjacent to the plurality of distance markings.

9. The reticle of claim 1, further comprising a milling tree.

10. The reticle of claim 9, wherein the milling tree comprises a horizontal baseline having a first end and a second end, wherein the milling tree comprises a first vertical end line extending perpendicularly from the first end of the horizontal baseline and a second vertical end line extending perpendicularly from the second end of the horizontal baseline line.

11. The reticle of claim 10, wherein the milling tree further comprises a plurality of primary measurement lines and a plurality of secondary measurement lines extending perpendicularly from the horizontal baseline.

12. , The reticle of claim 11, further wherein the milling tree comprises a plurality of primary measurement lines and a plurality of secondary measurement lines extending perpendicularly from the first vertical end line.

13. The reticle of claim 12, further wherein the milling tree comprises a plurality of primary measurement lines and a plurality of secondary measurement lines extending perpendicularly from the second vertical end line.

14. The reticle of claim 11, wherein the plurality of secondary measurement lines are positioned between the plurality of primary measurement lines.

* * * * *